INVENTORS.
EDWARD N. SINGER
FRANCIS A. GIORDANO
BY
Ernest J Weinberger
ATTORNEY

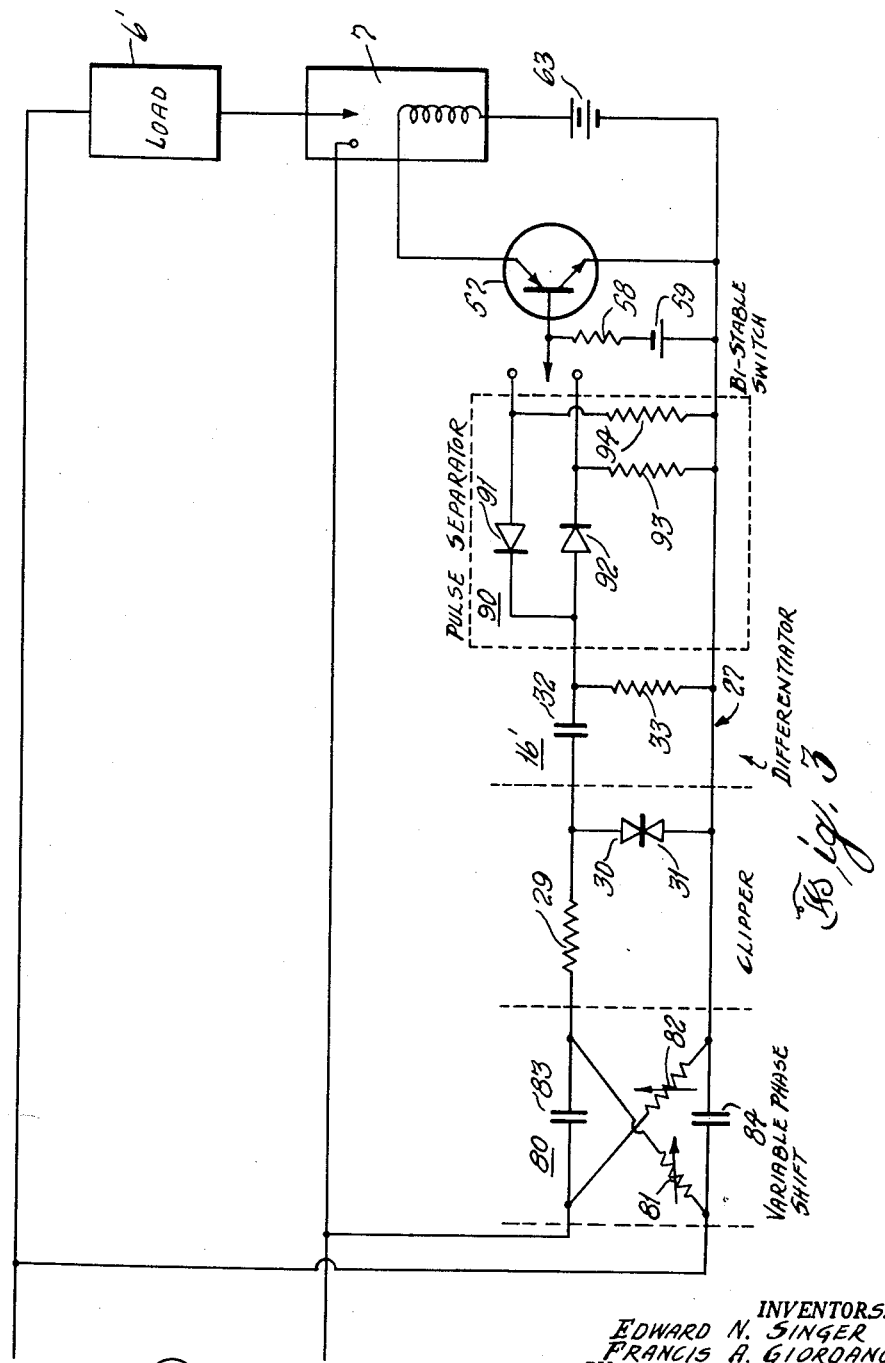

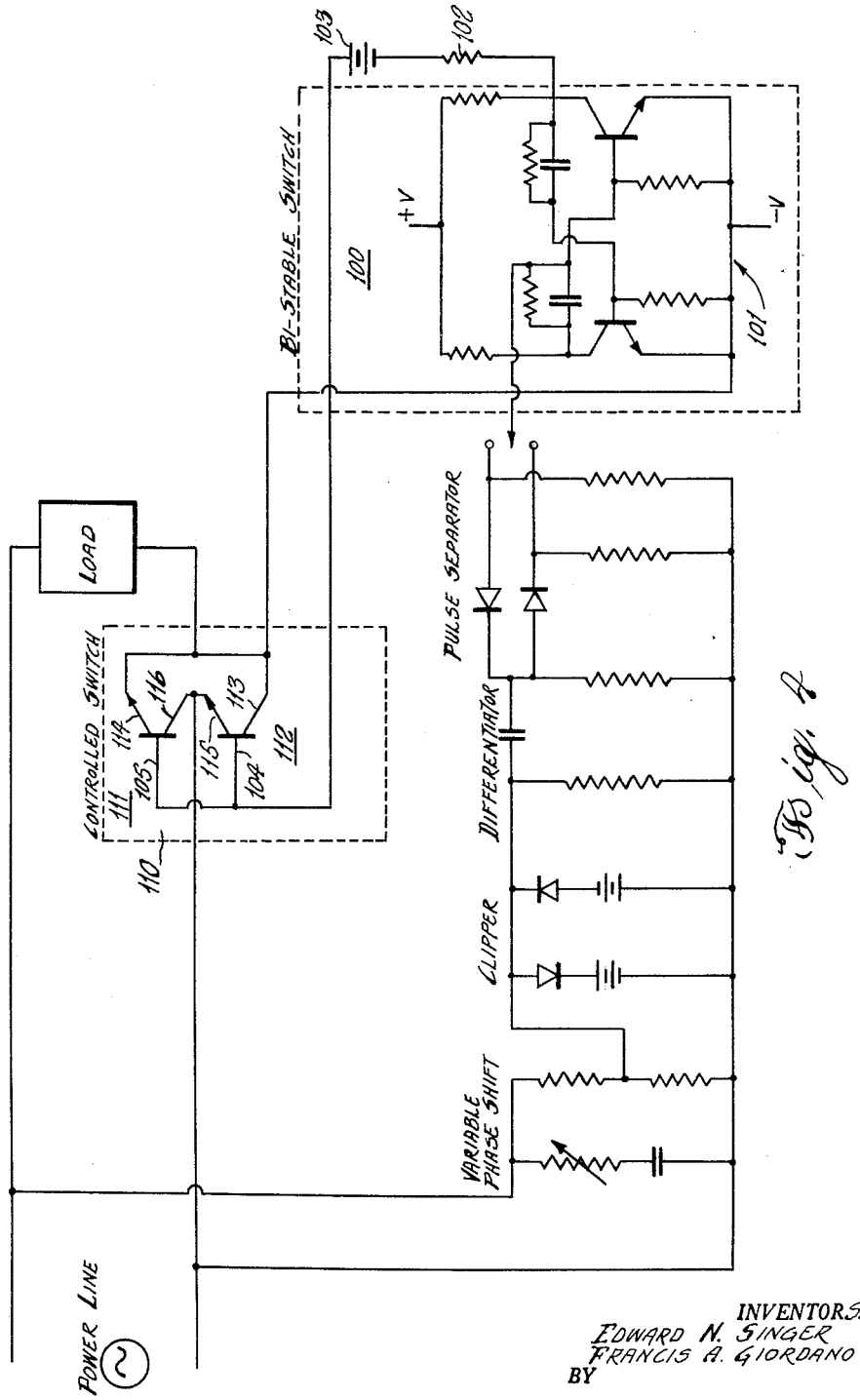

United States Patent Office 3,069,569
Patented Dec. 18, 1962

3,069,569
TIME CONTROLLED SWITCHING SYSTEM
Edward N. Singer, Jamaica, and Francis A. Giordano, Brooklyn, N.Y., assignors to the United States of America as represented by the Secretary of the Navy
Filed May 29, 1961, Ser. No. 113,560
12 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

This invention relates to circuit controlling apparatus and more particularly to a device or system for controlling the time at which an A.C. signal or power line is switched both on and off. The invention, in addition, relates to a method and device for accurately switching an A.C. line at any preselected point along its cyclic variation.

The switching on and off of power circuits are both accomplished by means of a control circuit operating at low levels of voltage and current. In the past it has been possible to control the switching on at a preselected point but not the switching off because the devices used, such thyratrons, lost low level control after being switched on. It was necessary to interrupt the high voltage and the anode of the thyratron devices to turn them off.

With the advent of highly sensitive circuitry and its close physical association with power lines, a unique problem has arisen in that the switching of the power or signal lines directly affects various other circuits. Probably the most common source of difficulty is that of an arc generated across the switch contacts of power lines. In addition to the deterioration of the contacts themselves, the arc generates excessive radio frequency interference which in turn is picked up or detected by nearby susceptible electronic equipment. Under certain circumstances, such as where the interference is conducted along cables or wires, its effects are evident at remote or distance locations. The magnitude of the arm which is thusly generated depends for its energy upon some form of energy storage component in the circuit which includes the switch contacts. Inductors and capacitors constitute the major sources of storage components. That is to say, when an A.C. circuit having in series therewith an inductor (e.g. load) is switched off there remains within the inductor some magnetic energy. This storage energy is transferred across the switch contacts and so forms the energy within the arc. At times this energy will, so to speak, oscillate between the contacts and the inductor due in part to the variation in capacitance across the opening contacts and so produce therebetween electromagnetic radiation. A similar effect occurs when a circuit containing a capacitive load is suddenly energized by the shorting of the switch contacts.

Various methods and devices have been suggested to overcome both the contact deterioration and the generation of interfering electromagnetic energy. The majority of these involve the placement across the operating contacts, a device, which will lower the impedance across the contacts during their operation. Devices of this sort include resistors, rectifiers, surgistors, various solid state elements, capacitors and various combinations of these. Although it is true that these devices to some degree accomplish their intended purpose, yet it is well known that each is limited in some respects as to its use, as for example, can it be used for both making and breaking of the contacts? Since these elements are in general, passive devices the freedom of use is substantially restricted and they directly affect the circuit in which they are placed. A rather simple example of this is the lengthening of the response time required to operate the contacts controlled by a relay across whose contacts a passive network has been inserted. Of course, the most paramount drawback of these devices lies in the fact that electronic technology has progressed to a point where the equipment employed requires an extremely high signal to noise ratio especially in the case of highly sensitive receivers. Within this class of low noise equipments we find parametric amplifiers, masers, etc., which are subject to false or deleterious operation with the injection of radio interference. The prime source of such interference is the switching of A.C. power lines and supplies. Prior devices fail to solve this critical problem since they were designed to operate in conjunction with older equipment and in general to protect the contacts themselves.

Prior devices employed for accomplishing the switching of A.C. power circuits at a selected point in the cyclic excursion of the voltage or current are both bulky, expensive and in most cases inaccurate since they depend to a great extent on mechanical components. This problem occurs where, for example, it is desired to switch or replace the generator feeding a line with another or alternate generator. The switching must be carried out at a particular time and phase, otherwise either or both of the generators may be damaged. The problem is even more acute where the equipment using the power line is subject to adverse effects due to sudden changes in the phasing and where the frequency of the supply line is above several hundred cycles per second.

An object of this invention is to provide a device for the reduction of the intensity and duration of the arc initiated uopn the switching of an A.C. power or signal line.

Another object is to provide a switching system for an A.C. signal line which will substantially reduce the generation of radio frequency energy across the switch contacts.

Still another object is to provide an A.C. switch which may be accurately activated at any desired point along the voltage or current variation of the supplv line.

A further object of this invention is to provide an electrically and mechanically accurate, efficient, simple and inexpensive switching device which will reduce the formation of an arc, the rad'o frequency energy and permit the selection of the instant of switching.

Other objects and advantages will be apparent from the following description of some embodiments of the invention and the novel features thereof will be particularly pointed out hereinafter in conjunction with the appended claims.

In the accompanying drawings:

FIG. 3 is still another embodiment made in accordance with the present invention; and FIG. 4 is a wiring diagram of still another embodiment made in accordance with the present invention.

Figure 1:
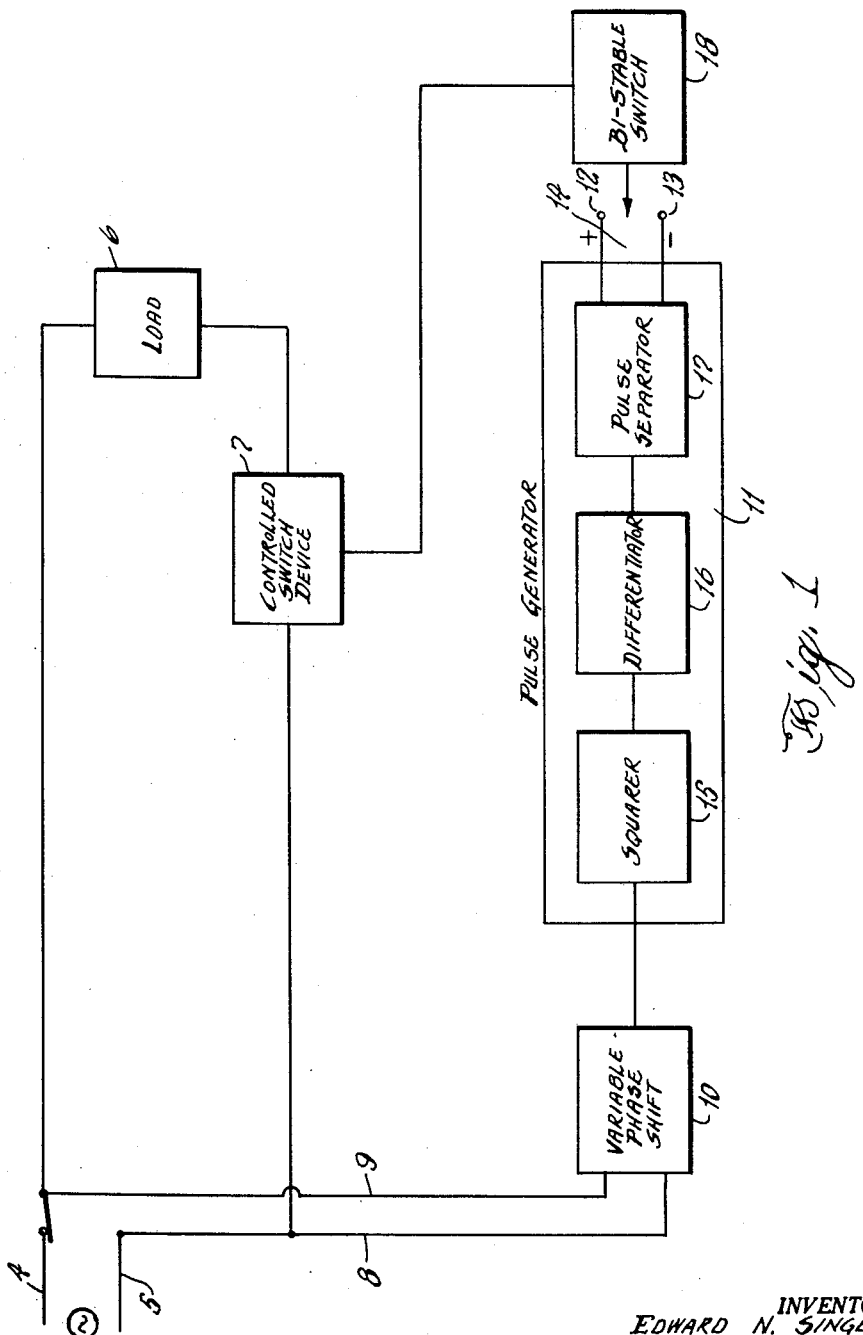
FIG. 1 is a block diagram of a general embodiment made in accordance with this invention.

In the illustrated block diagram of FIG. 1, an alternating current (A.C.) in power or signal form is carried by wires 4 and 5 which are terminated in a load 6 which may be capacitive, inductive, resistive or any combination of these. For the sake of simplicity, an inductive load will be considered first and then reference made to the other possibilities. A controlled switch 7, which may be of any type although a fast acting relay has proved satisfactory, is inserted in series with the line for either opening or closing the line much as an ordinary switch would do. The only difference being that this switch is electrically controlled in that it closes or completes the line under one electrical condition and opens the line under another electrical condition. In its simplest form this component might be a relay which closes the line when it is energized electrically and opens the line when it is de-energized or vice versa.

A pair of leads 8 and 9 connect in parallel across the line a variable phase shift network 10 which is capable of continuously varying the phase between the electrical signal input and the output of this network. The phase shift output is fed into a pulse generator 11 which generates a series of pulses which are separated by approximately one-half wavelength of the input signal and of the same polarity as the input voltage. The output is such that the positive pulses are fed out on one terminal while the negative pulses are fed out on another separate terminal. These terminals may be as indicated the two contacts 12 and 13 of a double throw switch 14. In other words, the switch 14 is employed to select which type of pulse, negative or positive will be fed out. A simple form of such a pulse generator might comprise a squarer 15, a differentiator 16 and a pulse polarity separator 17. The pole portion or selector of switch 14 is connected to a bistable network 18 so that either the positive or negative pulse output of the generator 11 can be selected as the input therefor but not both. The bistable network is such that when a positive pulse appears at its input it will assume one of two possible stable output states and remain therein until the presentation of a negative input whereupon it will instantaneously assume and remain in the other state. By way of example, the two states might be (1) current or voltage output and (2) no output. The bistable output is fed into the control of the switch 7 so as to either activate or deactivate its contacts. If it be a relay, then, the current output of the bistable network would close the relay contacts and complete the A.C. line while no output from the bistable network would cause the relay contacts to separate. It should be borne in mind that the current or voltage controlling the switch 7 is relatively small as compared with the A.C. or signal current. This brief rudimentary description of the embodiment in block diagram form serves as an introduction to the ensuing descriptions of actual physical embodiments made in accordance with the present invention.

Figure 2:
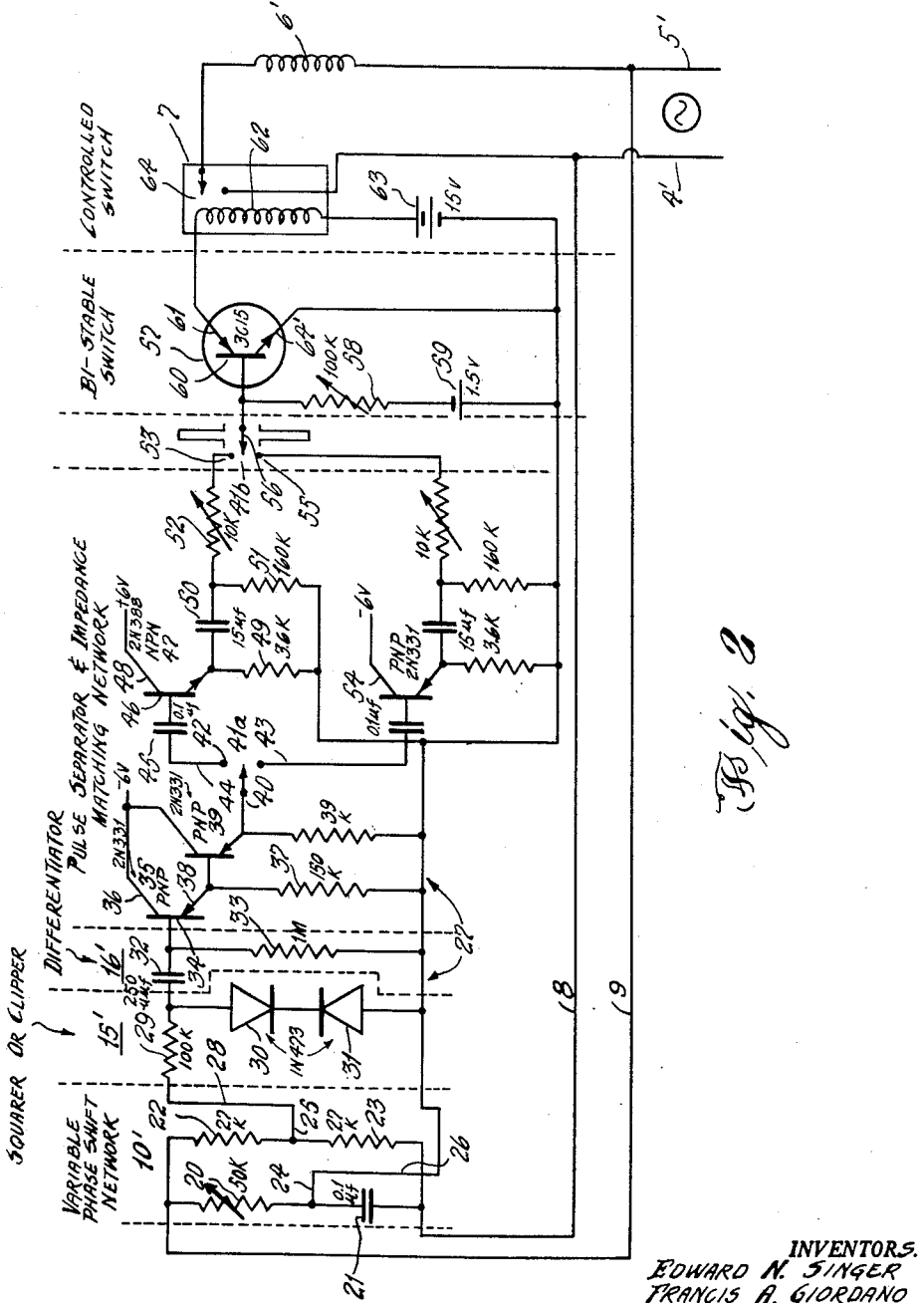
FIG. 2 is a schematic diagram of one embodiment made in accordance with this invention.

The schematic diagram of FIG. 2 conforms with the explanation of FIG. 1 and also shows an embodiment with additional features not shown specifically in the block diagram. A typical power line or signal line which consists of lines 4' and 5' is terminated in a load 6' which, for purposes of illustration, is shown to be inductive and has in series therewith a portion of a relay 7. Parallel connected across the power line by wires 8 and 9 is the variable phase shift network 10' which consists of a pair of parallel connected networks. The input or wires 8 and 9 are connected across a series combination of a variable resistor or a potentiometer 20 and a capacitor 21 across which combination is also connected a pair of series resistors 22 and 23. The output of the phase shift network is taken between the junction points 24 and 25 formed by the capacitor 21 and potentiometer 20 and between the two resistors 23 and 24. One of these junctions, namely, 24 is connected by wire 26 to a ground or common 27. The potentiometer resistance may be selectively varied and thereby the phase relationship between the input and output can be changed continuously from 0° to 180° where the resistors 23 and 24 are equal. This type of network is known as a bridge type phase shift network and is fully discussed with references in a number of texts such as Radiotron Designers Handbook, 4th ed. published by the Wireless Press and distributed by R.C.A. In effect, this network 10' provides an output which is of the same frequency as the input but having any selected phase relationship therewith.

The output of the phase network is fed by wire 28 through resistor 29 to one end a pair of back to back well-known Zener or Avalanche diodes 30 and 31 of which the opposite end is connected to the common 27. This combination of Zener diodes forms the squarer network and serves as is well known to clip or limit the sine wave input to a predetermined value which is a function of the resistor 29 and the particular characteristics of the diodes used or which may be externally biased. With this dual diode arrangement the clipping occurs for both negative and positive cycles of the input resulting in approximately a square wave output from the squarer circuit 15'. Where control of the degree of clipping is desired, a variable resistor may also be substituted for resistor 29. An arrangement of this sort although not illustrated permits a greater latitude of both adjustment and calibration of the entire device. It has been found that satisfactory operation is obtained without a variable component, provided proper component values are selected. It is for this reason, namely, to enable anyone to fabricate a working device, that component values have been shown in FIG. 2 although these may be varied to some extent.

The output from the squarer circuit 15' is applied to the capacitor 32 which forms the integrator portion of an R.C. circuit with resistor 33. Since the output of this network 16' is taken across the resistor, it is referred to as a differentiator and its action is quite well known. The R.C. time constant of this network is chosen to be small as compared with the period of the input wave which is the same as the power or signal line in order that the differentiator output is impulsive or a narrow sharp pulse. The shorter the time constant, the sharper or narrower become the output pulses so that by selecting the values of resistor 33 and capacitor 32 the pulse width can, within limits, be determined and selected. Since it is desirable, as will become subsequently evident, to form a narrow pulse within the circuitry, a square wave or an approximately square wave is fed into the R.C. circuit 16'. This is evident when one considers that the pulse shape output of this network 16' depends on the rate of change of the input voltage and a square type wave has an extremely rapid voltage rise.

Up to this point, an input sine wave has been converted into a series of pulses corresponding in polarity and period to the original input with a selected phase shift relation therebetween. In other words, a series of pulses of alternate polarity separated by one-half the period of the original wave. This output is generated effectively across a megohm resistance or any comparable high value and must be applied to the input of a semiconductor device which is a low impedance circuit as illustrated. If the output of the differentiator were fed directly into a semiconductor device it would be shunted thereby and the transfer of energy would be lowered due to the shunting and the poor impedance matching. In order to overcome this and to increase the efficiency of operation, an impedance matching network is disposed therebetween. Although other means are available to accomplish the matching and the fact that operation of the device can be carried out with any such matching, the transistors employed as shown in FIG. 2 have given acceptable results, serve to illustrate at least one simple expeditious circuit for solving the problem. The output from the differentiator which is developed across the one megohm resistor 33 is applied to the base 34 of an PNP type transistor 35 which is arranged in the common-collector circuit form where a negative potential is applied to the collector 36. The transistor types illustrated and the voltages shown in FIG. 2 are for illustrative purposes and other types may be substituted therefor. The output of the transistor 35 is taken across the resistor 37 from the emitter 38 to the common 27. With this arrangement the input to the transistor and that which it presents is relatively high while its output impedance is considerably lower and is developed across resistor 37 which has a lower resistance itself than 1 megohm so that the transistor has effectively lowered the input impedance for the next succeeding stage. This next stage which consists of transistor (PNP) 39 and is also of the common collector form accomplishes and operates in a manner similar to that previously described for transistor 35 to further lower the impedance. This second transistor 39 is, however, terminated by a resistance lower than that associated with transistor 35. The output of transistor 39 is applied to one pole 40 of a double throw-double pole switch 41 which, for the sake of clarity, is shown as two separate sections 41a and 41b. Pole 40 in operation can assume either of two or three positions, namely, the upper contact 42, the lower contact 43, or no contact. The upper contact is connected by wire 44 through isolation capacitor 45 to the base 46 of a common collector NPN transistor 47 whose collector 48 is at a positive potential. This transistor 47 serves a dual purpose in that just as the other transistors, it further lowers the output impedance and at the same time produces an output only when a positive potential is applied to its base 46. In other words, it is activated only by a positive input. In order to insure good D.C. isolation and freedom from spurious triggering, capacitor 45 is placed in the input circuit. The output of this stage is taken across resistor 49 (emitter to common 27) and applied through isolation capacitor 50 to a resistor network comprising resistor 51 and a variable resistor 52 which serve to permit the control or selectivity of the output pulse level which voltage pulse voltage is applied to the upper contact 53 of switch section 41(b) opposite the first mentioned contact 42. The lower contact 43 of switch section 41a is connected to a transistor stage similar to that previously described except the transistor 54 is a PNP and the collector has a negative potential applied thereto. The output of this stage feeds the lower contact 55 of switch section 41b and its components except for transistor 54 are identical with those used in the stage employing transistor 47. Since this is a PNP transistor and the collector is at a negative potential only a negative input will result in any output.

Viewing this entire pulse separator and matching stage, one readily observes that the input at the base 34 of transistor 35 which is a series of alternate negative and positive pulses is fed through transistors 35 and 39 where the pulse emerge subs.antially unchanged except that the output impedance is much lower than the input impedance. The output of transistor 39 is selectively by positioning the switch poles fed to one pole of switch 41 so that at a selected level, either a series of negative or positive pulses, separated by one wavelength of the original input, are fed into the other pole 56 of switch 41 through the separator transistors 47 and 54. In other words, since both poles are ganged or coupled, then when they are both in their upper positions, contacting respectively contacts 42 and 53, only the positive pulses emanating from the differentiator would appear at pole 56 while in their lower positions only negative pulses would appear thereat.

Pole 56 of switch 41 is connected directly to the base of a trigistor 57 which is a PNPN semiconductor element, sometimes also referred to as a "silicon trigistor." One such device is manufactured by Solid State Products and was the unit employed in the illustrated embodiment. The trigistor is a PNPN semiconductor component with characteristics which approximate the circuit function of a bistable mul.ivibrator. A variable resistor 58 and a source of D.C. potential, such as battery 59, are series connected between the base 60 and the common 27. This circuit negatively biases the base with respect to the collector 61 which forms part of a closed series loop circuit and includes the coil portion 62 of relay 7, a battery 63 or a D.C. source which applies a positive potential to the collector, and the common 27. The trigistor emitter 64' is directly connected to the common 27 so that in some respects the trigistor is in the common collector circuit form. In operation the trigistor 57 is either "on" or "off," which constitute i:s two stable states, so that for the circuit shown, the circuit from collector to emitter is either conducting or non conducting. When the base is made more positive as by a positive pulse from switch pole 56 it provides in its "on" state a low impedance path whereby the loop from collector to emitter is completed and the current through the relay coil 62 closes the operating contacts 64, thereby completing the power line circuit. This may be made to act in an entirely opposite way by selecting the relay so that with a positive pulse the power line will be open circuited. The trigistor will remain in this state until a negative voltage is applied to the base and then it will so to speak open-circuit and open the power line since the relay contacts will separate.

Summarizing the entire operation, it can readily be observed that an A.C. signal from the power source is always present across the phase shift network 10' and the input sine wave is converted by the squarer 15', and the differentiator 16' into a series of alternate negative and positive pulses which after impedance matching are separated and applied to opposite contacts of switch portion 41b. If the power line 4'-5' is to be turned on, then the switch is snapped so that only the positive pulses (poles to contacts 42 and 53) are applied to the trigistor. Where it is desired to instantaneously switch the A.C. "on" at a particular point along the wave shape, the phase shift resistor 20 is adjusted. This may be done in a number of ways but probably the simplest is to observe on an oscilloscope (not shown) the point at which the contacts of relay 64 close relative to the A.C. wave and vary the resistor 20 until the selected point is reached. For each observation the switch 41 must be activated since the bistable trigistor will remain in one state or the other until a pulse of the opposite polarity is applied. The oscilloscope leads may be placed directly across contacts of relay 64 or across a resis or in the power line. The adjustment of the phase in effect triggers the trigistor at some time or phase relative to the A.C. wave-shape thereby closing the contacts of relay 64. If the load 6' is inductive, then in order to minimize the overshoot or the pulse generated due to the energy stored, the switching should take place at the instant the A.C. current is passing through its zero current. On the other hand, if the load is capacitive then while the voltage goes through zero.

In general, the variable phase shift circuit is set so that the energy in the load is zero at the time of switching. Where an inductive load is considered the current through the induc:ance is sampled by observing the voltage across a small resistance (not shown) in series with the load. The phase of this current is then compared on an oscilloscope (i.e. dual beam) to the negative pulse being applied to the trigistor and is then shifted relative thereto until the pulse, which is quite narrow and sharp, occurs exactly at the zero point on the cycle of the load current. This adjustment of the switching serves to minimize the interference and arcing which takes place almost entirely when an inductive current is opened since the energy is at a minimum. Likewise when a capacitive load is considered, the positive pulse is adjusted to occur at the moment the voltage across the load goes through zero on the cycle since the interference and arcing take place on the closing of the switch contacts. Where the load is a combination of resistance inductance and/or capacitance, the degree of phase shift required may be calculated beforehand or it may be adjusted by observing on a scope the A.C. waveshape and selecting that adjustment which results in the best waveform (i.e. least distortion, etc.) or minimum generated interference.

FIGS. 3 and 4 illustrate two other embodiments made in accordance with the invention wherein certain portions thereof have been altered with respect to the embodiment of FIG. 2, and other circuits substituted therefor. The circuit components identical with those previously described bear the same reference numerals. Referring now specifically to FIG. 3, the phase shift network 80 which employs variable resistors 81 and 82 cross-connected between capacitors 84 and 83 operates as is well known to produce any desired phase shift up to 180 degrees by mere adjustment of resistors 81 and 82.

The pulse separator network 90 is of a simple type employing a pair of diodes 91 and 92 connected one in each of two branch lines at the output of the differentiator circuit 16'. They are connected so that their conduction paths or directions are opposite from one another and each is connected to the common 27 at their ends furtherest from the differentiator, by resistors 93 and 94. With this arrangement, one diode conductos during the positive pulse input while the other is blocking and alternately the other conducts for a negative pulse while the first-mentioned blocks so that they provide separate paths for pulses of opposite polarity. The final circuitry shown in FIG. 3 is identical with that discussed with FIG. 2. Although only certain circuitry has been substituted, others may be equally well substituted for, as for example, in FIG. 4 the trigistor has been replaced by a bistable transistor multivibrator 100 and the relay replaced by a controlled switch device 110 comprising a pair of power transistors 111 and 112, as illustrated, with the common 101 of the multi connected to the collector 113 of one transistor and the emitter 114 of the other and both connected to one side of the power line. The output of the multi is fed through an isolation resistor in series with a battery 103 to the bases 104 and 105 of the transistors. Since the controlled switch device 110 must be in series with the load in the power line, the free emitter 115 of one transistor and the free collector 116 of the other are joined and connected to the power line. The operation of this circuit is substantially as follows: A positive pulse input to the multi causes it to assume one stable state, namely, to conduct, in which state it remains until a negative pulse is applied. With the positive input and subsequent conduction of the multi, the voltage bias from the battery 103 lowered by the multi output thereby causing the transistors to conduct and completing the A.C. power line. A negative pulse cuts off the multi, raises the bias on the transistors, so that they cannot conduct effectively, and opens the A.C. power line. These power transistors 111 and 112 are connected back to back in order to permit A.C. conduction.

It may now be readily observed that with the devices described above, one may control the time at which a power or signal line is activated and deactivated relative to the power or signal line voltage and/or current, with a low voltage and current controlling to actual switching. Under proper operation, the device will minimize the radio interference and arcing which usually accompanies the opening and closing of switch contacts.

It will be understood that various other changes in the details, materials, and the arrangements of parts which have been herein described and illustrated in order to explain the nature of this invention, may be made by those skilled in the art within the principle and scope of the invention as expressed in the appended claims.

We claim:

1. A device for selectively controlling the time at which an alternating current signal line will be activated and deactivated relative to its instantaneous voltage, which comprises a selectively variable phase shift network having input and output terminals, said input terminals of said phase shift network electrically connected across said signal line, pulse generating means for generating alternate positive and negative output pulses with alternate pulses separated and having input terminals and separate output terminals for each pulse polarity by one-half a cycle of said signal line frequency, said generating means input terminals connected to said phase shift network output terminals, bistable means capable of assuming either of two stable electrical output states dependent on the voltages polarity of an input signal thereto and having input and output terminals, contacting means for selectively connecting individually one of said separate pulse generating means output terminals to said bistable input terminals, controlled switch means at least a portion of which is series connected in said signal line and having input terminals connected to said bistable means output terminals, said switch means responsive to one of said bistable electrical states to electrically complete the circuit of said signal line and the other of said states to open circuit said signal line whereby said signal line may be activated and deactivated at any selected time during its cycling excursion by selectively varying said phase shift network and said contacting means.

2. The device according to claim 1, wherein said pulse generating means also includes a means for clipping and squaring an input sine wave signal, an R-C differentiator circuit and separator means for separating pulses of opposite polarity into two separate electrical paths.

3. The device according to claim 1, wherein said bistable means is a bistable multivibrator.

4. The device according to claim 1, wherein said controlled switch means is an electrically responsive relay.

5. A device for suppressing the arc and transient generated by the switching of an alternating current potential source with a load connected to said source, which comprises a relay having at least two portions, one of said portions including a pair of contacts serially connected between said load and said source and responsive to an electrical input at another portion of said relay, variable phase shift means connected across said source pulse generator means including, asymmetric conducting means for clipping and squaring said source potential, differentiator means, and pulse separator means providing two separate electrical paths, one of said paths for conducting positive pulses and the other of said paths for negative pulses, bistable means having its output connected serially with said another portion of said relay and its input selectively connected to one of said paths, said bistable means capable of producing an electrical output of one constant level when the input is of one polarity and another constant level distinct from said first mentioned level when the input is of the opposite polarity whereby said contacts will close in response to one of said levels and open in response to the other of said levels.

6. The device according to claim 5, wherein each of said paths of said pulse separator means include therein asymmetrical current elements oriented to conduct current in one of said paths in a direction opposite to the other of said paths.

7. The device according to claim 5, wherein each of said paths of said pulse separator means includes a transistor having a base, an emitter and a collector, one of said transistors biased to pass only positive pulses and the other biased to pass only negative pulses.

8. The device according to claim 5, wherein said device also includes impedance matching and transforming means disposed between said differentiator means and said bistable means.

9. The device according to claim 8, wherein said impedance matching and transforming means includes at least a circuit having therein a transistor having a base, collector and emitter, said circuit connected in emitter follower circuit form.

10. The device according to claim 5, wherein said bistable means is a PNPN semiconductor device having a base, emitter and collector.

11. A device for selectively controlling the time at which an alternating current source will be applied to or interrupted from a load connected in series therewith, relative to the voltage of said source which comprises phase shift means connected across said source for selectively varying the phase between the input and the output of said phase shift means, pulse generating means connected to receive the output of said phase shift means and for generating in response thereto alternate pulses of opposite polarity each separated from the preceding pulse by one-half the wavelength of said alternating source, and also including pulse separator means providing separate electrical paths for pulses of opposite polarity, bistable multivibrator means for providing a biasing output level when activated by a pulse of one polarity and another biasing output level when activated by a pulse of the opposite polarity, means for selectively connecting one of said separate paths to said bistable multivibrator means, controlled switching means connected in series with said source and said load, said controlled switching means connected for receiving said bias output and responsive to interrupt said series connection between said source and said load at one of said bias output levels and to maintain a continuous closed circuit therebetween at the other of said bias output levels whereby said source may be applied to and interrupted from said load at any selected time relative to the source voltage by selectively varying said phase shift means and by selecting one of said paths.

12. The device according to claim 11, wherein said controlled switching means includes a pair of parallel connected power transistors having their bases connected for receiving said bias output levels.

No references cited.